United States Patent [19]

Uemura

[11] Patent Number: 4,731,181

[45] Date of Patent: Mar. 15, 1988

[54] APPARATUS FOR MEMBRANE SEPARATION

[75] Inventor: Keiji Uemura, Yokohama, Japan

[73] Assignee: Kurita Water Industries Ltd., Tokyo, Japan

[21] Appl. No.: 865,497

[22] Filed: May 20, 1986

[30] Foreign Application Priority Data

May 30, 1985 [JP] Japan .............................. 60-81384[U]

[51] Int. Cl.⁴ .............................................. B01D 13/00
[52] U.S. Cl. ............................... 210/321.89; 210/416.1
[58] Field of Search ............... 210/321.1, 416.1, 433.2, 210/321.89

[56] References Cited

U.S. PATENT DOCUMENTS 3,963,616 6/1976 Parsons et al. ............... 210/321.1 X
4,062,771 12/1977 Saupe ........................... 210/321.1 X
4,187,173 2/1980 Keefer ......................... 210/416.1 X
4,432,876 2/1984 Keefer ......................... 210/416.1 X Primary Examiner—Frank Spear
Attorney, Agent, or Firm—Frank J. Jordan; C. Bruce Hamburg; Manabu Kanesaka

[57] ABSTRACT

A module of membranes for permeatingly treating fluid to be treated is housed in a pressure vessel, and, in this pressure vessel, a device for feeding the fluid to be treated is integrally connected to this pressure vessel. The pressure vessel has devices for taking the permeated fluid and the thickened fluid out of the module, respectively.

17 Claims, 7 Drawing Figures

APPARATUS FOR MEMBRANE SEPARATION

FIELD OF THE INVENTION AND RELATED ART STATEMENT

This invention relates to an apparatus for membrane separation, and more particularly to an apparatus for membrane separation, wherein a driving section and a membrane separating section are directly connected to each other to thereby obtain an apparatus for membrane separation facilitated in the handling, transportation and installation.

In recent years, in water treatment field for liquids containing various inorganic and organic materials, such as waste water treatment, conversion of sea water into plain water and production of pure water, there have been widely used apparatuses for membrane separation each incorporating therein ultrafiltration membranes, reverse osmosis membranes or selective permeation membranes including precision filtration membranes or the like, i.e. an apparatus for ultrafiltration, an apparatus for reverse osmosis membrane separation and the like.

In general, the apparatus for membrane separation of the type described comprises a pressure vessel incorporating therein selective permeation membranes such as reverse filtration membranes, a high pressure pump for feeding a stock solution under pressure to the stock solution feeding chamber of the pressure vessel, a blower, a vacuum pump, a motor for driving the pump, a piping provided therearound, valves, gauges, an electric instrumentation system and so on.

Since, in the conventional apparatus for membrane separation, a membrane separating section, wherein only selective permeation membranes are incorporated in a pressure vessel, a pump for feeding a stock material, a blower and a driving section such as a starting motor are connected to one another through a piping, the following disadvantages have been presented.

(1) The apparatus as a whole becomes large-sized.
(2) In consequence, the installation area is large.
(3) It is difficult to manufacture, transport and install the apparatus.
(4) Multiplicities of pipings, valves, gauges, frames and the like are needed and the arrangement of apparatus is complicated.
(5) When the apparatus is used as a plant or a part of plant, each of the component parts must be designed and the required assembling operation is complicated.
(6) It is not easy to select the materials of the pipings, valves and the like and to set up the sizes thereof, and, mistakes in selection and setup of the materials may lead to the physical deterioration of the selective permeation membranes.
(7) The pipings, valves and the like cause leakage and vibrations, whereby the stabilized operation may be hampered.

OBJECTS AND SUMMARY OF THE INVENTION

An object of the present invention is to provide an apparatus for membrane separation, wherein the installation area can be minimized due to the simplified arrangement and the transportation and installation works are facilitated.

Another object of the present invention is to provide an apparatus for membrane separation, wherein the operation control is easily effected.

The other objects of the present invention may be made clear from the following description.

To achieve the above-described objects, the present invention contemplates that membrane separation means incorporating a membrane module in a pressure vessel thereof and means for feeding fluid to be treated into this pressure vessel are integrally connected to each other, and this pressure vessel includes means for taking out permeated fluid of the module and memans for taking out thickened fluid.

DETAILED DESCRIPTION OF THE PREFERRED EMBODIMENTS

Figure 1:
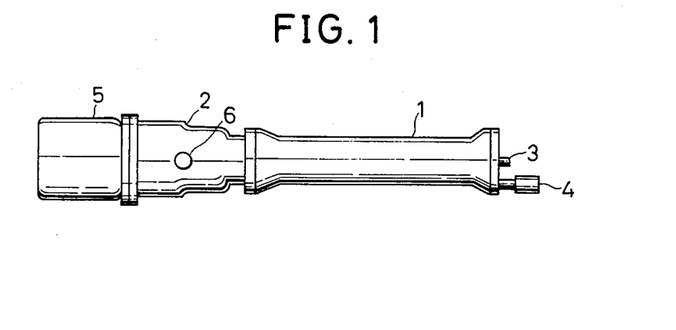
FIG. 1 is a block diagram of the apparatus for reverse osmosis membrane separation showing one embodiment of the apparatus for membrane separation according to the present invention.

FIG. 1 is a block diagram of the apparatus for reverse osmosis membrane separation showing one embodiment of the apparatus for membrane separation according to the present invention.

A pressure vessel 1 incorporating therein reverse osmosis membranes is directly connected at one end thereof to a pump 2 for feeding liquid to be treated under pressure and provided at the other end thereof with a discharge port 3 for permeated liquid and another discharge port 4 for thickened liquid. In other words, the pressure vessel 1 is of such an arrangement that a large pressure chamber is formed in a pump discharge section, reverse osmosis membranes are mounted to the interior of this pressure chamber, and the permeated liquid discharge port and the thickened liquid discharge port are provided at the forward end of the pressure vessel.

The pump 2 is integrally formed on a motor 5 for driving the pump and is of such an arrangement that feeding means including the pump 2 and the motor 5 and membrane separation means incorporating therein the reverse osmosis membranes are directly connected to each other to thereby form a unitary structure, as shown.

In the apparatus shown in FIG. 1, liquid to be treated is delivered under pressure from a feed port 6 of the pump into the pressure vessel 1 and subjected to the membrane separation treatment.

It is preferable to form the pressure vessel into a cylindrical shape. When formed into the cylindrical shape, the pressure vessel 1 may have an outer diameter of about 300 mm and a total length of about 2,500 mm for example. As a matter of course, other dimensions may be adopted. The shape of the pressure vessel 1 need not necessarily be cylindrical, and any other shape may be adopted.

Figure 2:
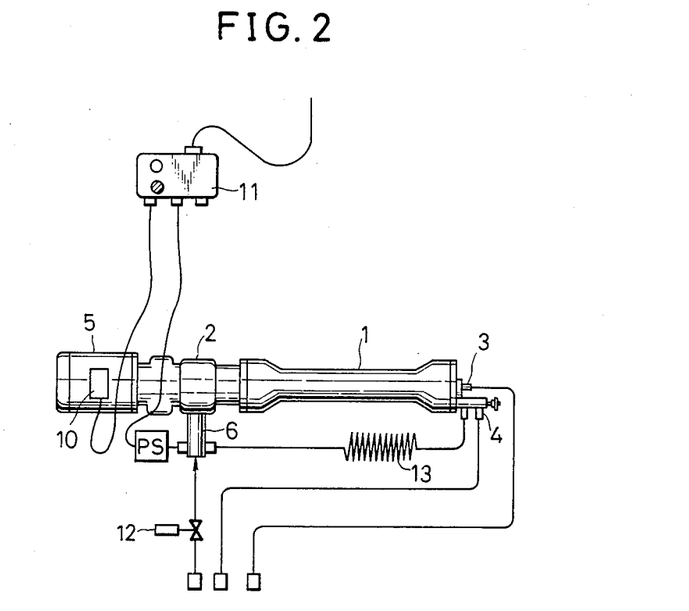
FIG. 2 is a view showing the appearance of an apparatus for treating liquid, wherein the apparatus according to the present invention is used.

FIG. 2 shows an appearance of a liquid treatment apparatus using the apparatus for membrane separation of substantially the same arrangement. In FIG. 2, a terminal 10 of the motor 5 is connected to a power source through a switch 11, whereby the motor 5 is started to thereby drive the pump 2. With this arangement, the liquid to be treated is passed through a valve 12, enters the pump 2 through the feed port 6, and is supplied to the reverse osmosis membranes in the pressure vessel as a power liquid. A permeated liquid, which has passed through the reverse osmosis membranes is collected in a liquid collecting pipe, not shown, and discharged to the outside of the apparatus through the permeated liquid discharge port 3. On the other hand, a thickened liquid, which has not passed through the membranes and thickened, is discharged through the thickened liquid discharge port 4.

According to the present invention, as shown in FIG. 2, a recycle tube 13 is provided to treat the thickened liquid by recycling, so that the recovery percentage can be improved to a great extent.

The above-described apparatus for reverse osmosis membrane separation in this embodiment can be actuated or stopped by a very simple operation such as a manual operation by us of a power switch.

Figure 4:
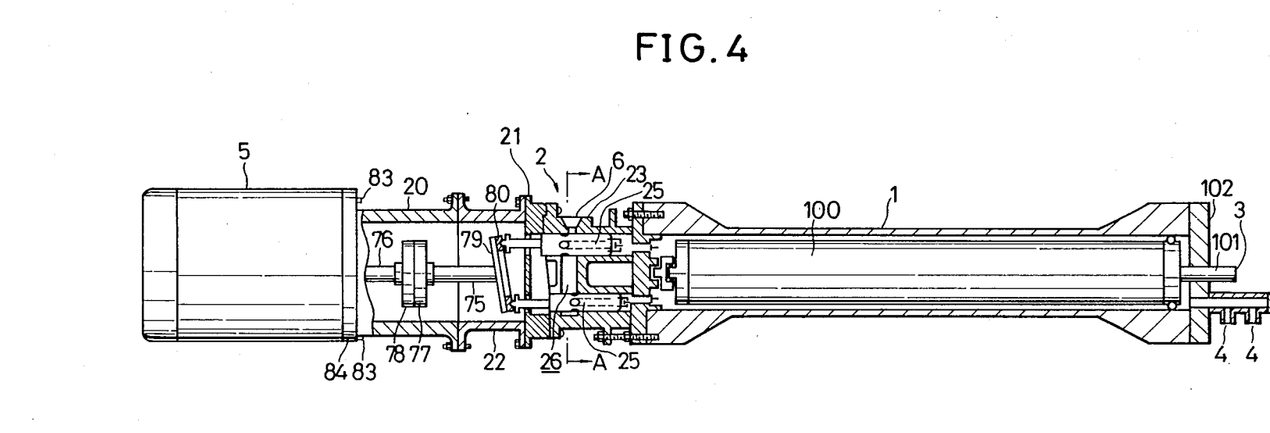
FIGS. 4, 5 and 6 are sectional views in explanation of the internal arrangement of the apparatus shown in FIG. 2, FIG. 5 consisting of 5(A) and 5(B) and FIG. 6 being a section taken along the line A—A in FIG. 4.
Figure 5A:
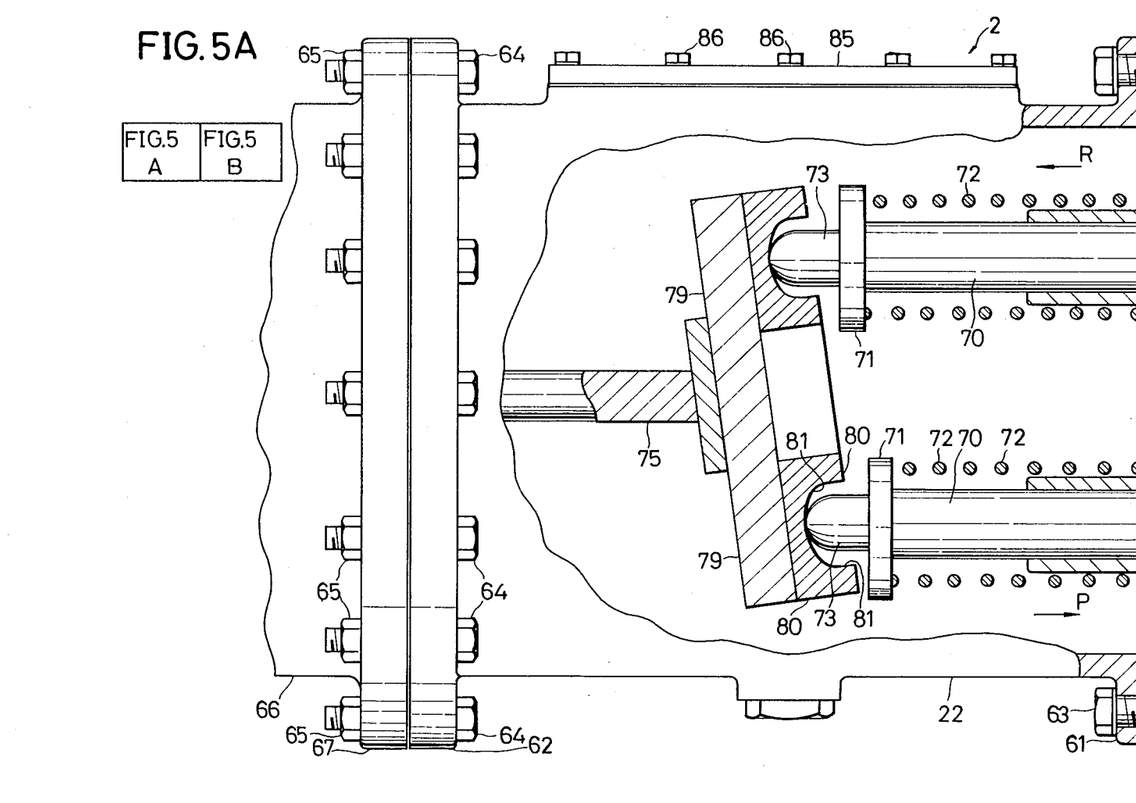
Figure 5B:
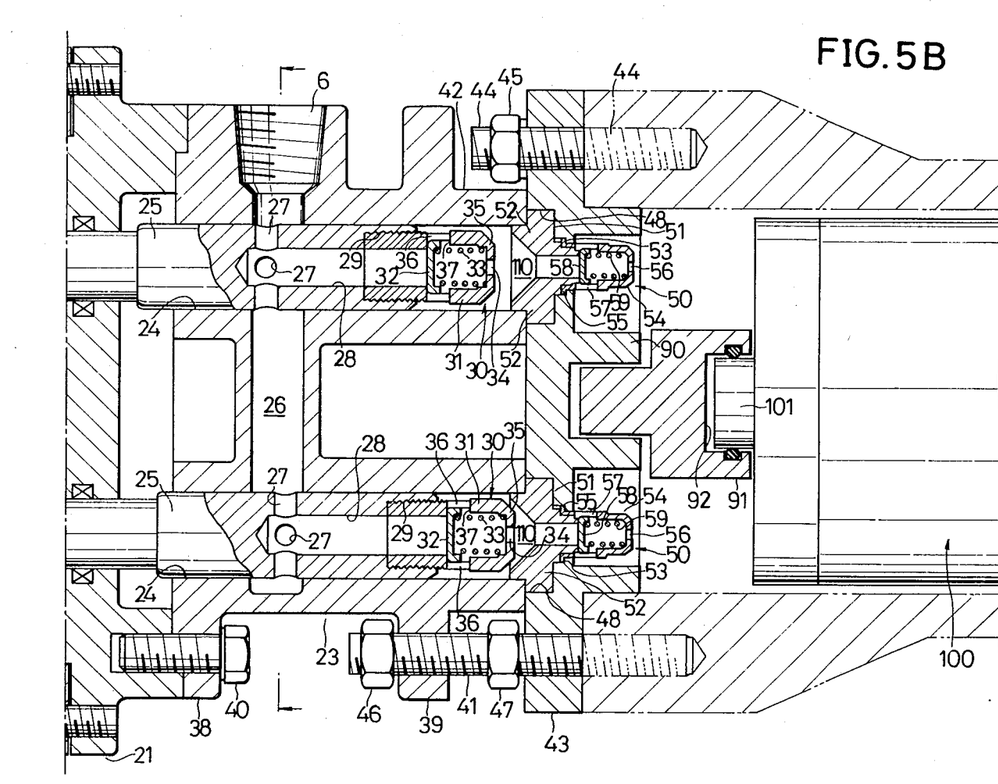
Figure 6:
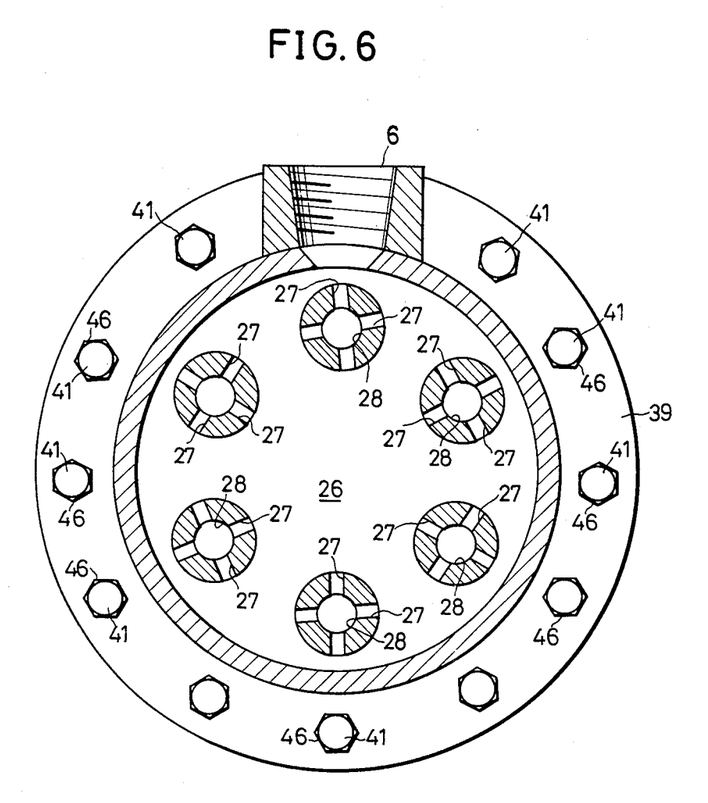

Detailed description will hereunder be given of the arrangement of the apparatus for membrane separation shown in FIG. 2, with reference to FIGS. 4 to 6.

The motor 5 is connected to the pump 2 through a connector 20. The pump 2 has casings 22 and 23, to which the pump 2 is connected through a flange plate 21. The casing 23 is provided with a plurality, for example 6, of cylinder holes 24, into which a plunger 25 is slidably inserted. The casing 23 is provided with a feed port 6 for communicating the cylinder holes 24 with the outside in a direction perpendicularly intersecting the longitudinal direction of the cylinder holes, and the inner peripheral surface of this feed port 6 is internally threaded. The internal threads are threadably coupled to external threads formed on a connecting metal secured to the forward end of a feed pipe, not shown, to thereby be connectable to the feed port 6. As clearly shown in FIG. 6, a water receiving chamber 26 is extended in a direction perpendicularly intersecting the longitudinal direction of the cylinder holes 24. The feed port 6 communicates this vacant chamber 26 with the outer surface of the casing 23. A through-hole or holes 27 are provided on the plunger 25 in directions perpendicularly intersecting the axial line of the plunger 25. The though-hole 27 are formed at positions where the opening of the through-hole constantly faces the receiving chamber 26 when this plunger is reciprocatorily operated. In this embodiment, two of the through-holes 27 are provided in two directions and intersect each other. One, two or more through-holes 27 may be provided. The plunger 25 is formed with an elongated hole 28, so that the through-holes 27 can be communicated with the forward end face of the plunger. Internal threads 29 are formed on the inner peripheral surface of the hole 28 on the side of the forward end of the plunger 25.

The plunger 25 is provided at the forward end thereof with first valves 30. Each of the first valve 30 has a valve box 31, a valve body 32 and a spring 33, which are housed in this valve box 31. The valve box 31 is of a generally cylindrical shape, external threads are formed on the outer peripheral surface of the valve box 31 on one end thereof. The external threads are threadably coupled to the internal threads 29, whereby the valve box 31 is fixed to the plunger 25. A small hole 34 is formed in the center of the valve box 31 on the other end thereof and a step 35 is formed around the small hole 34. The inner peripheral surface in the center of the valve box 31 extending in the longitudinal direction is recessed in a ring-shape, and formed with a plurality of window holes 36.

The valve body 32 has such dimensions as to be coupled into the ring-shaped recess 37 and to be reciprocated in the axial direction of the valve box 31. The spring 33 is compressed between the valve body 32 and the step 35 and pushes the valve body 31 in a direction opposite to the step 35.

The casing 23 is provided with flanges 38 and 39. The flange 38 is secured to the flange plate 21 through a bolt 40. The flange 39 is secured to the pressure vessel 1 through long stud bolts 41 and nuts 46. The casing 23 has a tubular portion 42 projected farther to the forward end of the flange 39, and a flange plate 43 is interposed between this projected portion 42 and the pressure vessel 1. The flange plate 43 is secured to the pressure vessel 1 through the long bolts 41 and nuts 47, with short stud bolts 44 and nuts 45 being threadably coupled thereto. The stud bolts 41 and 44 are solidly studded at the ends thereof into the pressure vessel and nuts 45, 46 and 47 are threadably coupled thereto. The nut 47 is threadably coupled to the intermediate portion of the elongated bolt 41 before the bolt 41 is engaged with the flange 39. The nuts 47 in cooperation with the nuts 45 secure the flange plate 43 to the pressure vessel 1. The long bolts 41 and the short bolts 44 are alternately provided along the circumference of the disc-shaped flange plate 43. Nuts 46, are threadably coupled onto all of the long bolts 41 passing through holes formed in the flange 39.

In the flange plate 43, openings 48 are formed at positions meeting the cylinder holes 24 of the casing 23 and provided with second valves 50, respectively. The openings 48 are diametrically narrowed down in two steps from the side closer to the casing 23 and are two-stepped. A first step 51 receives a ring 52 between the casing 23 and itself. A second step 53 receives a part of the ring 52 and a flared edge 55 of a valve box 54, thus securing the valve box 54.

The valve box 54 is of something like a cylindrical shape and formed at the forward end thereof with a small opening 56. The central portion of the valve box 54 in the axial direction thereof is formed into a ring-shaped groove, the inner peripheral surface of which is recessed to a slight degree. In this groove, a plurality of window holes 57 communicate the interior with the exterior of the valve box 54. The diameter and thickness of the valve body 58 are determined such that the valve body can move in the axial direction of the groove. The valve body 58 is urged by a compression spring 59 compressed between the valve body 58 and the edge portion of the opening 56 in a direction opposite to the opening 56.

The casing 22 has flanges 61 and 62. The flange 61 is secured to the flange plate 21 through a bolt 63. The flange 62 is secured to a flange 67 of a casing 66 of the connector 20 through the bolt 64 and a nut 65.

The plunger 25 has a shaft 70 integrally formed thereon. The shaft 70 extends through the flange plate 21. The shaft 70 is integrally formed at the forward end thereof with a collar 71. Compressed between the collar 71 and the flange plate 21 is a compression coil spring 72. The forward end 73 of the shaft 70 is of a spherical shape.

Designated at 75 is a shaft connected to a motor shaft 76 through connecting discs 77 and 78. An inclined plate 79 which inclines to a normal plane to the axis of the shaft 75 is solidly secured to the forward end of the shaft 75. The inclined plate 79 is solidly secured at the surface of disc thereof with a ring 80, which is provided with a groove 81 concentric therewith. Walls of the groove 81 are smoothly carved and a spherical forward end 73 is inserted into this groove 81.

The casing 66 of the connector 20 has a flange 84, which is secured to the side surface of the motor 5 through a bolt 83.

The casing 22 is provided with an inspection window, to which is secured a plate-shaped lid 85 through bolts 86. The casing 66 is provided with similar inspection means, not shown.

Integrally provided at the center of the flange plate 43 on the side of the pressure vessel 1 is a short tube 90, into which is inserted one end of a holder 91. The other end of the holder 91 is formed into a recess 92, into which is inserted a center tube 101 of a separation membrane module 100. Engagement between the both members holds the module 100 in a predetermined position.

The module 100 is of such an arrangement that bag-shaped membranes are wound around the center tube 101. Nets and spacers such as porous plates are provided in and between the bag-shaped membranes.

The center tube 101 has a slit communicated with interiors of the bag-shaped membranes. One end of the center tube 101 is blocked and inserted into a recess 92 of the holder 91. The other end of the center tube 101 extends through an end plate 102 of the pressure vessel 1 and the forward end thereof is formed to provide the permeated liquid discharge port 3.

The module 100 has the bag-shaped membranes and the spacers. The liquid to be treated flows into portions of the spacers formed between the bag-shaped membranes, whereby part of the liquid is passed through the bag-shaped membranes and enters the center tube 101.

In the apparatus for membrane separation with the above-described arrangement, rotation of the motor 5 rotates the inclined plate 79 through the shafts 76 and 75, whereby the shaft 70 received in the groove 81 is reciprocated in the axial direction thereof, so that the plunger 25 makes strokes in a direction indicated by an arrow R or P. When the plunger 25 moves in the direction indicated by the arrow R, the pressure of water in the receiving chamber 26 overcomes the resiliency of the spring 33 to push the valve body 32 in P direction opposite to the direction indicated by the arrow R, whereby the water is passed through the holes 27, 28 and the window hole 36 and enters into a chamber 110 located at a position farther than the forward end of the plunger 25.

Movement of the plunger 25 in the direction indicated by the arrow P closes the passage 29, whereby the water in the chamber 110 is pressed by the plunger 25 to push the valve body 58, flows into the pressure vessel 1, holding the pressure, and further, flows into the module 100 portion. Further, part of the water is permeated through the membranes, enters the bag-shaped membranes, shortly enters the center tube 101, reaches the permeated liquid discharge port 3, and taken out as the permeated liquid. The liquid, which has not passed the membranes, is thickened, reaches the thickened liquid discharge port 4, and is extracted to the outside of the pressure vessel 1. According to the present invention, various other mechanisms, wherein the plunger 25 is reciprocated can be adopted except the mechanism, wherein the inclined plate 79 rotates to reciprocate the shaft 70 received in the groove 81 of the ring 80, whereby the plunger 25 is reciprocated as in this embodiment.

In the apparatus according to the present invention, the feeding means directly connected to the membrane separation means to form a unitary structure includes every fluid conveying means such as the blower, the compressor and the vacuum pump in addition to the pump and the motor as shown in FIGS. 1 and 2. Furthermore, the feeding means may be one, wherein the fluid to be treated is delivered under pressure from the upstream side of the membrane separation means as shown in FIGS. 1 and 2. On the contrary, the membrane separation means of a type, wherein the separated fluid is sucked at the downstream side of the membrane separation means, may be adopted.

Additionally, although a type of the pump reed not necessarily be limited in particular, it is preferable to use the plunger type, the piston type and the like, which have the quantitative characteristics. Adoption of the quantitative pumps makes it possible to satisfactorily use the same apparatus for the fluid to be treated of any permeation pressure, so that such a troublesome process that design of the apparatus cannot be initiated unless the fluid to be treated is analyzed and studied, can be omitted thus offering a great advantage in standardization of the apparatus.

Furthermore, adoption of the adapter as the means for direct connection between the membrane separation means and the driving means (the pressure vessel 1 and the pump 2 as shown in FIGS. 1 and 2) makes it possible to facilitate the exchange of the membrane separation means and the like, so that the membranes of any type can be applicable. Moreover, proper use of membranes for the sea water and the brine and exchange of the membrane separation means make it possible to utilize the same apparatus for desalting water containing various salt contents.

The membranes installed in the apparatus for membrane separation of the type described are broadly divided into a flat plate type membrane, a tubular membrane, a spiral type membrane, a hollow filament type membrane and a fold type membrane in accordance with the shapes of elements. As the materials, in general, there may be listed cellulose acetate, polysulfone, polyethylene, polypropylene, polyacrylonitrile, polyamide, polyvinyl chloride, polyvinyl alcohol, polyimide, polyvinyl acetate and the like.

In the apparatus for reverse osmosis membrane separation according to the present invention, the quantity of desalted water per apparatus amounts to 5–8 $m^3/d$ in the case the sea water and 17–20 $m^3/d$ in the case of brine, for example. The recovery percentage amounts to 8–20% in the case of sea water and 8–75% in the case of brine for the treatment depending on the quality of water. Each of these values is an example, and the present invention need not necessarily be limited to this. It is preferable to provide the recycle tube when the recovery percentage exceeds 25% as in FIG. 2.

Figure 3:
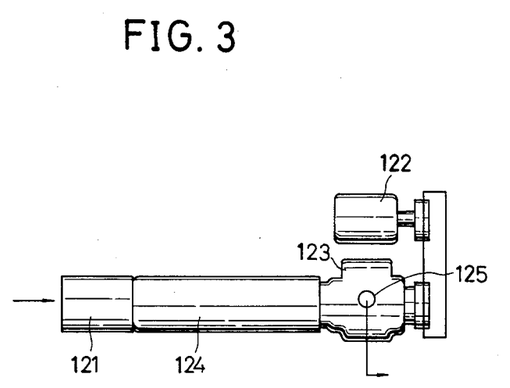
FIG. 3 is a block diagram showing another embodiment of the apparatus for membrane separation according to the present invention.

Description will hereunder be given of one embodiment of the apparatus for membrane separation for use in gas separation according to the present invention with reference to FIG. 3.

In FIG. 3, gas to be treated such as air is induced by a vacuum pump 123 driven by a motor 122, passed through strainer 121, introduced into a vessel 124 incorporating therein gas separation membranes, and treated for membrane separation. The permeated gas is exhausted through a permeated gas exhaust port, not shown, and the thickened gas is exhausted through a thickened gas exhaust port, not shown.

In the apparatus for membrane separation of gas as shown in FIG. 3 also, the membrane separation means including the vessel 124 incorporating therein the separation membranes and the driving means including the pump 123 and the motor 122 are directly connected to each other to form a unitary structure.

The apparatus for membrane separation according to the present invention is highly compact in size to facilitate the operation, so that the apparatus can be directly connected to a service water piping for use in supplying drinking water in a hotel, an office and the like. Furthermore, connection is made through a pump and a filter, so that the apparatus can be appropriately applied to a construction site and for temporary use on the field such as the military purposes and the disaster relief.

As for the apparatus for membrane separation according to the present invention, description has been made with reference to the apparatus for reverse osmosis membrane separation incorporating therein the reverse osmosis membranes and examples. However, the apparatus for membrane separation according to the present invention need not necessarily be limited to this, and, it is needless to say that the present invention is appropriately applicable to all of the apparatuses each incorporating therein the membranes having the selective permeation function such as the ultrafiltration membranes and precision filtration membranes in addition to the reverse osmosis membranes.

As has been detailedly described hereinabove, the apparatus for membrane separation according to the present invention is constructed such that the membrane separation means including the vessel incorporating therein the membranes and the driving means for delivering the fluid to be treated to the membrane separation means are directly connected to each other to form the unitary structure, whereby the apparatus is rendered simplified in arrangement, highly compact in size and light in weight and reduced in the member of component pasts to a considerable extent. Therefore, the transportation and maintenance are highly simplified and the operation is facilitated. Furthermore, the complicated piping works and the installation of instrumentation are obviated, and labor therefore is reduced to a considerable extent. Moreover, the apparatus is very high in reliability.

Thus, the apparatus for membrane apparatus as a whole is small-sized, requires the small installation area and facilitates the manufacture, transportation, installation, control, operation and the like, so that the apparatus can be applied to the very wide fields.

What is claimed is:

1. An apparatus for membrane separation, comprising:
    a module of membranes for permeatingly treating fluid to be treated;
    a pressure vessel incorporating therein said module;
    means for taking out the module-permeated fluid and means for taking out the thickened fluid, which are provided in said pressure vessel;
    means for feeding the fluid to be treated under pressure into said pressure vessel, said feeding means being connected to said pressure vessel to form a unitary structure and including a plunger type pump and a motor with a shaft for driving the pump, said pump including a casing, a rotary shaft situated inside the casing and connected to the shaft of the motor, an inclined plate provided on said rotary shaft and inclined to a plane normal to the axis of said rotary shaft, a ring concentrical with said rotary shaft on the side opposite to the motor, a ring shaped groove with a smooth wall formed inside the ring, a plurality of plungers slidably situated in the casing and having spherical forward ends situated in the ring shaped groove, and a plurality of coil springs for pressing said plungers such that the forward ends of the plungers are pushed into the ring shaped groove.

2. An apparatus for membrane separation as set forth in claim 1, wherein said feeding means and said pressure vessel are connected to each other through bolts.

3. An apparatus for membrane separation as set forth in claim 1, wherein said pump and said motor are connected to each other through bolts.

4. An apparatus for membrane separation as set forth in claim 1, wherein said casing of the pump is secured to said pressure vessel through bolts.

5. An apparatus for membrane separation as set forth in claim 4, wherein a casing of a connector is interposed between said casing of the pump and said motor and said connector casing is secured to said motor and said pump casing through bolts, respectively.

6. An apparatus for membrane separation as set forth in claim 5, wherein said membranes are reverse osmosis membranes.

7. An apparatus for membrane separation as set forth in claim 1, wherein said membrane module has a center tube and bag-shaped membranes wound around said center tube.

8. An apparatus for membrane separation as set forth in claim 7, wherein said center tube extends through an end plate of the pressure vessel and projects to the outside of the pressure vessel.

9. An apparatus for membrane separation as set forth in claim 1, wherein said membrane are reverse osmosis membranes, precisison filtration membranes or ultrafiltration membranes.

10. An apparatus for membrane separation as set forth in claim 1, wherein means for returning thickened fluid taken out of the pressure vessel to the pressure vessel is provided.

11. An apparatus for membrane separation as set forth in claim 1, wherein an opening for inspecting the interior of said pump casing is provided on said pump casing and a lid is secured to said opening through a bolt.

12. An apparatus for membrane separation as set forth in claim 1, wherein a plurality of plungers are arranged in a circumferential direction.

13. An apparatus for membrane separation, comprising:
    a module of membranes for permeatingly treating fluid to be treated;
    a pressure vessel incorporating therein said module, said pressure vessel having means for taking out module-permeated fluid and means for taking out thickened fluid; and
    pump and motor means for feeding the fluid to be treated under pressure into said pressure vessel, said pump and motor means being connected directly to said pressure vessel to form a linear unitary structure, said pump and motor means including a plunger type pump for feeding the fluid to be treated under pressure into said pressure vessel, said pump having a rotary shaft therein and being connected directly to said pressure vessel, a motor having a rotary shaft connected to the rotary shaft of said pump, and casings for enclosing said pump and motor to form a linear unitary structure.

14. An apparatus according to claim 13, wherein said pump comprises:
   a plate provided on said rotary shaft of the pump, said plate being inclined relative to a plane normal to the axis of said rotary shaft;
   a ring secured to the plate at a side opposite to the motor to be concentric with said rotary shaft of the pump, said ring having a ring-shaped groove with a smooth wall;
   a plurality of plungers slidably situated in the casing, each plunger having a spherical forward end situated in the ring-shaped groove of the ring; and
   a plurality of coil springs attached to the respective plungers for pushing the plungers toward the ring-shaped groove so that when the inclined plate is rotated by means of the motor, the plungers are moved back and fourth inside the casing of the pump to send fluid to the pressure vessel.

15. An apparatus according to claim 14, wherein each plunger includes a through hole therein extending along the longitudinal direction thereof and having an inlet and outlet to permit fluid flowing from the inlet to the outlet through the hole.

16. An apparatus according to claim 15, wherein said pump further comprises:
   a plurality of first valves connected to the respective plungers at the outlet thereof, each first valve including a first valve box with a plurality of first openings, a first valve body situated inside the first valve box, and a first valve spring situated inside the first valve box to urge the first valve body toward the outlet so that only when the plunger is moved toward the motor, fluid passes through the first valve; and
   a plurality of second valves connected to the casing to permit communication between the respective first valves and the pressure vessel, each second valve including a second valve box with a plurality of second openings, a second valve body situated inside the second valve box, and a second valve spring situated inside the second valve box to urge the second valve body toward the plunger so that only when the plunger is moved toward the pressure vessel, fluid passes through the second valve and flows to the pressure vessel.

17. An apparatus for membrane separation, comprising:
   a module of membranes for permeatingly treating fluid to be treated;
   a pressure vessel incorporating therein said module;
   means for taking out the module-permeated fluid and means for taking out the thickended fluid, which are provided in said pressure vessel;
   means for feeding the fluid to be treated under pressure into said pressure vessel, said feeding means being connected to said pressure vessel to form a unitary structure and including a plunger type pump and a motor with a shaft for driving the pump, said pump including a casing, a rotary shaft situated inside the casing and connected to the shaft of the motor, an inclined plate provided on said rotary shaft and inclined to a plane normal to the axis of said rotary shaft, a plurality of plungers slidably situated in the casing and having forward ends abutting against the inclined plate, and a plurality of coil springs for pressing said plungers such that the forward ends of the plungers are pushed onto the inclined plate.

* * * * *